United States Patent
Vaccari et al.

(10) Patent No.: US 9,555,910 B2
(45) Date of Patent: Jan. 31, 2017

(54) APPARATUS WITH OPPOSING HOUSINGS FOR MODIFIED ATMOSPHERE PACKAGING OF PRODUCTS PLACED IN TRAYS

(75) Inventors: Massimiliano Vaccari, Reggio Emilia (IT); Andrea Schiavina, Correggio (IT)

(73) Assignee: GRUPPO FABBRI VIGNOLA S.P.A., Vignola (IT)

( * ) Notice: Subject to any disclaimer, the term of this patent is extended or adjusted under 35 U.S.C. 154(b) by 724 days.

(21) Appl. No.: 13/639,990

(22) PCT Filed: Apr. 4, 2011

(86) PCT No.: PCT/EP2011/055200
§ 371 (c)(1),
(2), (4) Date: Oct. 8, 2012

(87) PCT Pub. No.: WO2011/124548
PCT Pub. Date: Oct. 13, 2011

(65) Prior Publication Data
US 2013/0036706 A1    Feb. 14, 2013

(30) Foreign Application Priority Data

Apr. 8, 2010 (IT) .............................. BO2010A0211

(51) Int. Cl.
*B65B 31/00* (2006.01)
*B65B 31/02* (2006.01)

(52) U.S. Cl.
CPC .............. *B65B 31/028* (2013.01); *B65B 31/00* (2013.01); *B65B 31/02* (2013.01)

(58) Field of Classification Search
CPC ...... B65B 31/02; B65B 31/025; B65B 31/021; B65B 31/022; B65B 31/028; B65B 31/04; B65B 31/047; B65B 31/00; B65D 81/263; B65D 2205/02; B65D 51/1611; B65D 81/26; B65D 81/2069; B65D 81/261
(Continued)

(56) References Cited

U.S. PATENT DOCUMENTS 3,708,949 A * 1/1973 Wilcox ................. G01M 3/227
53/508
3,992,850 A * 11/1976 Vetter ............................. 53/510
(Continued)

FOREIGN PATENT DOCUMENTS

EP        1 842 776        10/2007
EP  PCT/EP2011/050731        8/2011
(Continued)

OTHER PUBLICATIONS

International Search Report for PCT/EP2011/055200 dated Jul. 1, 2011.
(Continued)

*Primary Examiner* — Andrew M Tecco
*Assistant Examiner* — Chelsea Stinson
(74) *Attorney, Agent, or Firm* — Marvin Petry; Stites & Harbison, PLLC

(57) ABSTRACT

When the opposing housings (1, 8) of the apparatus are closed, they form between them a small main chamber (P) delimited above by the film (H) for covering the tray and below by the tray (V) itself containing the product (M), and laterally by any suitable mechanical interface structure which surrounds the perimeter of said film and connects it to the perimeter of the upper edge (B) of the tray, this interface structure having holes (22) which are suitably distributed, are located outside the perimeter of the tray, and communicate with said main chamber (P). One or more of these holes (22) open(s) on at least one side of the tray and is/are connected to a first circuit (23, 24), while another one or
(Continued)

more of said holes (22') open(s) on at least one opposing side of the tray and is/are connected to a second circuit (17) which in turn is connected to the inner chambers of the two housings (1, 8). Means (18, 19, 20) are provided to operate in such a way that, in the step of vacuum formation, both said first circuit (24) and said second circuit (17) are connected to vacuum forming means (21) which are kept active for a sufficient time to eliminate some of the air from the inside of the tray and to act in such a way that said first circuit (24) is connected in the next step or at the correct time to means (25) for supplying the process gases, while said second circuit (17) is closed or remains in communication with the vacuum means (21) to ensure that the process gas entering the tray from said first circuit (22, 24) causes the residual air in the tray to flow out from and/or towards said second circuit (22', 17), thus flushing and saturating the inner volume of the tray, which is subsequently sealed using known steps and means for welding and finally cutting the film (H).

5 Claims, 2 Drawing Sheets

(58) Field of Classification Search
USPC ............... 53/511, 510, 329.3, 556, 432, 433
See application file for complete search history.

(56) References Cited

U.S. PATENT DOCUMENTS

| | | | | |
|---|---|---|---|---|
| 5,271,207 A * | 12/1993 | Epstein | ................ | B65B 31/043 53/403 |
| 5,323,590 A * | 6/1994 | Garwood | ................ | B65B 7/164 53/433 |
| 5,398,481 A * | 3/1995 | Takeuchi | .......... | H01L 21/67772 53/405 |
| 5,534,282 A * | 7/1996 | Garwood | ............. | B65D 25/102 426/396 |
| 6,305,149 B1 * | 10/2001 | Gorlich | .................... | B26D 7/10 53/329.5 |
| 6,834,476 B2 * | 12/2004 | Konishi | .................. | B65B 7/164 53/329.4 |
| 6,976,347 B2 * | 12/2005 | Karman | ............... | A23B 4/0053 53/428 |
| 7,205,016 B2 * | 4/2007 | Garwood | ................. | A23B 4/10 426/108 |
| 2005/0257501 A1 * | 11/2005 | Natterer | .................. | B65B 7/164 53/432 |
| 2008/0104930 A1 * | 5/2008 | Sparakowski | .......... | B65B 7/164 53/432 |
| 2013/0000254 A1 * | 1/2013 | Rebstock | .......... | H01L 21/67393 53/432 |
| 2013/0247510 A1 * | 9/2013 | Harlacher | ............... | B65B 31/04 53/79 |

FOREIGN PATENT DOCUMENTS

| | | |
|---|---|---|
| IT | 1 244 845 | 9/1994 |
| WO | WO 99/33703 | 7/1999 |

OTHER PUBLICATIONS

Written Opinion of the International Searching Authority for PCT/EP2011/055200 dated Jul. 1, 2011.

* cited by examiner

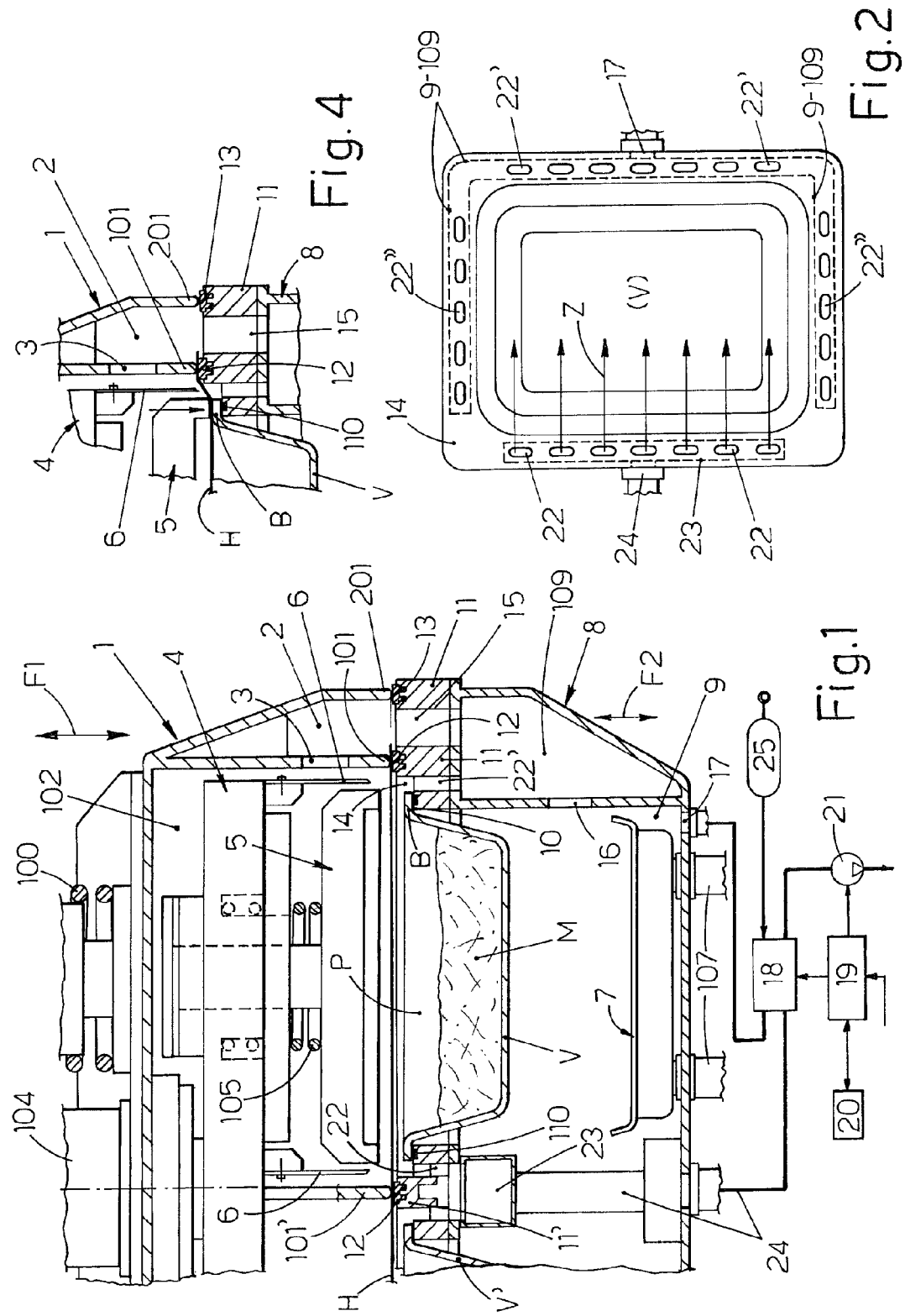

APPARATUS WITH OPPOSING HOUSINGS FOR MODIFIED ATMOSPHERE PACKAGING OF PRODUCTS PLACED IN TRAYS

The invention relates to a processing unit or apparatus which welds a sealing film in a gas-tight way onto at least one tray containing a product to be packaged. The apparatus in question is suitable for packaging machines known as "tray sealers", which weld a film on top of prefabricated trays filled with a product to be packaged, such as a food product. The apparatus according to the invention can be classified in IPC B65B31/04 since it is of the type with opposing housings and can produce packages of the type known as MAP (Modified Atmosphere Packages), in which the product is enclosed in a sealed packaging which contains a modified atmosphere, to improve the preservation of the product without any substantial difference in pressure between the inside and the outside. In order to modify the atmosphere, in a step in which the product placed in the tray is covered by the barrier film for subsequent sealing, which is kept suitably distant from the perimetric edge of the tray, air is initially removed from inside the tray and is then replaced with a modified atmosphere, such as an atmosphere based on nitrogen, carbon dioxide, oxygen and/or other gases.

For the implementation of this process in the prior art, the trays containing the products are housed in a lower housing which is open at the top, the edges of the trays bearing on the edge of the seat containing the trays. Means are provided for positioning the trays above the lower housing, for introducing them into this housing, and for extracting them at the end of the cycle, to enable them to be removed and replaced with new trays to be sealed. An upper housing is located above, and aligned with, the lower housing, and the film from which portions are taken for sealing the trays placed beneath it passes under the upper housing. When the trays have been positioned above the lower housing, the two housings are made to close onto each other and onto the film, which divides the inner spaces of the two housings from each other, and which is suitably raised above the edges of the trays, in such a way that the inner space of the trays filled with products communicates with the inner space of the lower housing. In the packaging cycle, the inner spaces of the two housings are connected to a vacuum source, in order to remove air from inside the trays through the lower housing and balance the counter-pressure on the film through the upper housing, in such a way that the film remains raised and separated from the trays. In the next step, the inner volume of the lower housing is separated from the suction circuit and is connected to a source for the progressive feed of the modified atmosphere, while the inner volume of the upper housing is connected to means for progressive pressurization, in such a way that the pressures acting above and below the film are kept, for example, at equal levels. The modified atmosphere is usually introduced into the lower housing until the pressure reaches the level of atmospheric pressure, and the upper housing is connected to a circuit which gradually connects it to the atmosphere. When the process gases have been introduced into the lower housing and then passed through this into the trays, at least the lower circuit for supplying the treatment gases is closed, and means located in the upper housing operate at the correct time by descending and interfering with the film in order to heat-weld it in a sealed way onto the edges of the trays and subsequently cut and separate the portion of film welded onto each tray from the remainder of the film which is connected to a reel for collecting the waste film. In the next step, the two housings open by moving away from each other, the packaged trays are extracted from the lower housing and are removed and replaced with new trays, the film advances by one step to remove the waste film and position new intact film over the new trays, and the cycle which has been described is repeated.

In other cases, the inner spaces of the two housings are connected to separate circuits, so that the film can be treated by the upper housing so as to give it an upwardly convex shape, which is particularly suitable for application to trays where there is an overflow of the product to be packaged. The vacuum is initially created by the circuit of the lower housing and the process gas for preserving the product is then injected. An example of this solution is described in US patent application 2005/0257501 published on Nov. 24, 2005, entitled: "Method and packaging machine for packaging a product arranged in a tray".

A similar method is described in Italian patent no. 1 244 845 of Nov. 22, 1990, entitled: "Packaging machine for sealing containers".

The main problem encountered with prior art tray sealers is that a large quantity of process gas, which is cyclically injected into the trays through the inner volume of the lower housing, remains in this housing and is then dispersed into the surrounding air at the end of the cycle when the housings are opened. This has a significant effect on packaging costs, since the price of process gases is considerable, and it also complicates the design of the machine because the dispersion of process gases into the environment has to be prevented by the use of suction hoods. In the recent application PCT/EP/2011/050731 dated Dec. 20, 2011, an attempt was made to overcome the aforesaid limitations of the prior art by constructing the means forming said opposing housings, between which the trays filled with product and the film above them are inserted, in such a way that, in a first step of closure of the housings, portions of film having a greater extension than the plan view of the edges of each tray are retained, and in such a way that the inner chambers of the upper and lower housings communicate with each other and with the inner space of the trays, enabling this whole circuit to be connected to the means for forming a vacuum in the trays. In the next step, said portions of film are brought towards the trays, but without sealing them, so as to form a main chamber of very small volume within each tray, which is separated from the inner chambers of the two housings and which is partly delimited by at least one component which has portions close to the edges of the tray and in which suitably distributed internal passages are formed, each of these passages having one end opening into said main chamber while its other end is connected to a process gas supply circuit. The process gases can then be injected directly through this circuit into said main chambers, and therefore directly into the trays, while the inner chambers of the two housings are gradually pressurized by a connection to the atmosphere, as is done in the prior art in the upper housing only. When the treatment of the trays is complete, the operating cycle continues in the conventional way, with the execution of the steps of heat-welding and cutting. When the two housings are opened with both of their inner chambers at atmospheric pressure, the considerable dispersion of process gases which occurs in the prior art does not happen here, since the small quantity of process gas supplied to the trays has been trapped within the small internal spaces of the trays which are sealed by their covers. The circuits connected to said main chambers can be used to carry out selective and, if required, differentiated treatments of groups of trays which are placed between the pairs of opposing housings from time to time.

When the last-mentioned solution was observed in operation, it was found that, when the trays were large and only partially filled with product, and/or when the product required the forced elimination of the oxygen contained in the ambient air, the time taken for the whole packaging cycle was relatively long, since a considerable amount of time is required for the forced evacuation of the air from inside the trays and for the subsequent injection of gas into the inner volumes of the trays.

At this point, a new major technical problem arose. This was the problem of forming acceptable packages of the MAP type, of any size and for any product, in limited operating times and with the preliminary formation of lower vacuums in the housings than those required by the prior art. A subsidiary problem arising from this major problem was that of enabling the user of the packaging machine to select, from the control panel of the machine, the type of cycle to be carried out, according to the type and characteristics of the product to be packaged and of the packaging, so as to prepare the machine for the execution of variable operating cycles which are technically reliable in all cases, in limited time intervals. These problems have been resolved by the solution claimed in the appended Claim 1 and in the subsequent dependent claims, based on the following proposal for a solution.

During the packaging cycle, it is possible to form a main chamber which is delimited by the film covering the tray, by the upper edge of the tray, and by a suitable mechanical interface structure which surrounds the perimeter of said film and connects it to the perimeter of said upper edge of the tray, while holes opening on the perimeter of the tray can be formed in this interface structure. Of these holes, the ones that open on at least one side of the tray are connected to a first circuit, while all the other said holes are connected to a second circuit which is connected to the inner volume of the lower housing and to that of the upper housing. In the step of vacuum formation, both said first and said second circuit are connected to the vacuum forming means which are kept active for a limited time, for example a time sufficient for the elimination of 30-50% of the air from the inside of the tray. When the vacuum has been formed, said first circuit is connected to the process gas supply source, while said second circuit is closed or remains connected to the vacuum pump, in such a way that a gas-flush cycle follows or is superimposed on a vacuum-gas cycle. The gas entering the tray from said first circuit forces the residual air in the tray to flow out through said second circuit, and simultaneously flushes and saturates the inner volume of the tray. Using this solution, it is possible to saturate the inside of the tray with process gases in a short time, after which the tray is finally sealed in the known steps of welding and final cutting of the film.

Further characteristics of the invention, and the advantages resulting therefrom, will be made clearer by the following description of some preferred embodiments of the invention, illustrated purely by way of non-limiting example in the figures on the two attached sheets of drawings, in which:

FIG. 1 is a cross-sectional view of the two opposing housings in the first step of closure onto the film, the housings containing a tray filled with product to be treated and sealed;

FIG. 2 shows schematically, in a plan view from above, a seat of the lower housing containing a tray to be treated and sealed;

FIG. 4 shows a significant part of the housing of FIG. 1 in the known step in which the film is welded onto the edge of the tray;

Figure 5:
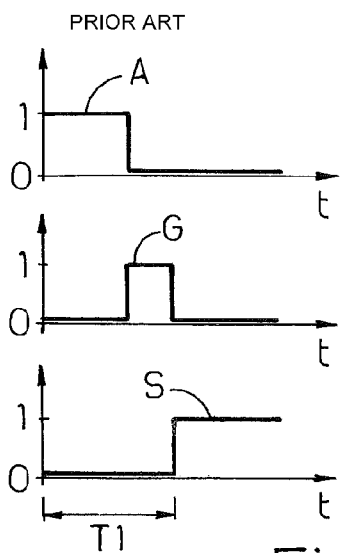
FIGS. 5, 6, 7 and 8 show some possible timing diagrams which relate the steps of vacuum, gas injection and welding of the tray to each other.

In FIG. 1, the number 1 indicates the upper housing which is provided in its lower part with inner annular edges 101, 101' and an outer edge 201 which surrounds said inner edges and which, together with the latter, delimits an annular chamber 2, also referred to as an outer upper chamber, which communicates, through apertures 3 suitably distributed along the edge 101, with the inner volume 102, also referred to as a main upper chamber, of the housing 1, which is connected to suitable vertical guiding and raising and lowering means which are indicated schematically by the double arrow F1 but are not illustrated in detail since they are already known. Within the housing 1 there is a plate 4 of a known type connected to special means 104 for selective raising and lowering, which, by means of respective interposed guide and spring means 105, support heat-welding units 5, also referred to as a welder, beneath them and carry cutting units 6 also referred to as a cutter which surround the outside of each welding unit 5 and are normally retracted from the latter. The housings shown in FIG. 1 are such that they can operate simultaneously on two parallel lines of trays V and V', but only the part intended to operate on a line of trays V has been depicted in a substantially complete way, although it is to be understood that the part of the housing intended for operation on the other line of trays V' is a mirror image of that illustrated and is identical thereto in all respects. However, it is to be understood that the protective scope of the invention also includes housings which can operate on a single line of trays or on a single tray, for which the edge 101' will be placed adjacent to an outer edge 201. The number 100 indicates known means for damping the closure of the upper housing 1 onto the aforesaid lower housing. The heat-welding film H passes under the housing 1 and is used to seal the preformed trays V filled with the product M, the trays being placed by any suitable means under the housing 1 and accurately centred with respect to said means 5 and 6, while also bearing on extractors 7 of a known type associated with the lower housing 8 with corresponding guide and movement means 107. The lower housing 8 is connected to suitable known raising and lowering means indicated schematically by the double arrow F2, and has a chamber 9, also referred to as a main lower chamber whose shape and size are such that it can house the extractor 7 with the tray V when the housing is raised (see below), this chamber being provided at its top with a seat having an annular opening 10, usually with a non-stick gasket 110, on which the lower part of the edge, or flange, B of the tray V is intended to bear in a sealed way. At a level above that of the annular seat 10, the lower housing 8 has flat surfaces 11, 11' with annularly continuous gaskets 12 and 13, aligned with and facing the edges 101, 101' and 201 of the upper housing 1.

Between the annular seat 10 and the flat surface 11 there is an annular recess 14 having suitable characteristics, while the portion of the flat surface 11 lying between said gaskets 12 and 13 has vertical apertures 15 in the form of holes or slots communicating with the underlying gap 109 which is connected to the chamber 9 through lateral apertures 16 of the lower housing 8, and communicating with the inner chamber 2 of the upper housing 1 which lies above when the two housings are closed as shown in FIG. 1 (see below). The chamber 9 has an opening with a conduit 17 which can be connected to or disconnected from a vacuum pump 21 by means of a shut-off unit with valve means 18, also referred to as a control valve, controlled by a processor 19. The number 20 indicates a unit for programming, and if necessary for interrogating and controlling, the processor 19 and the unit 18 connected thereto.

It can be seen in FIGS. 1 and 2 that the recess 14 surrounding the annular seat 10 has holes and/or slots on its four sides, arranged in at least two opposing rows 22, 22' or preferably in four rows as also indicated by 22", these last rows of holes being connected to the rows 22' and being connected, together with these, to the inner circuit 9, 109 of the housings 1, 8. The rows of holes 22 are connected to a manifold 23 of any suitable type, which is located inside the housing 8 and which is connected by means of one or more conduit(s) 24 to the shut-off unit 18 to which the means 25, also referred to as a source of process gas, for supplying the process gases to be injected into the trays are also connected.

The apparatus operates in the following way. In an intermediate step of the operating cycle, the apparatus is in the condition shown in FIG. 1. The tray V with the product bears with its edge B on the gasket 110 of the annular seat 10, the housings 1 and 8 are closed onto each other, with the edges 101, 101' and 201 interacting with the annular gaskets 12 and 13 and with a portion of film H clamped between the gasket 12 and said edges 101, 101' and suitably raised above the edge B of the tray. In a first operating step of the apparatus, the conduits 17 and 24 are connected through the unit 18 of FIG. 1 to the pump 21, also referred to as a vacuum source, which thus draws air both from the inside of the tray, through all the holes 22, 22', 22", and from the chambers 9, 109 of the lower housing, as well as from the chambers 2, 102 of the upper housing, in such a way that the pressures on the opposing faces of the film H are equal and the arrangement of the film in space is not substantially changed. When a sufficient vacuum has been formed in the tray, the conduit 17 is, for example, closed by the unit 18 in the connection to the pump 21, which, for example, is switched off (see below), and, at the correct time, the unit 18 connects the conduit 24 to the source 25 supplying the process gases which, as indicated by the arrows Z in FIG. 2, enter the tray V through the row of holes 22 and create a saturation front which advances in a uniform laminar way, without any development of turbulence, thus forcing the residual air in the tray to flow out through the rows of holes 22" and 22' and to enter the chambers 9, 109, 2, 102 of the housings where there is a low vacuum. The amount of gas entering the tray is equal to the amount of air leaving it and entering the inner chambers of the housings, and therefore the pressure on the opposite faces of the film H is substantially balanced. When the inner space between the tray and its covering film has been saturated with the process gases, the welding means 5 are lowered as shown in FIG. 4 to fasten the film in a gas-tight way, and at the correct time the unit 18 shuts off the connection of the conduit 24 to the process gas supply source 25. Thus the treatment gases rapidly saturate the inner space of the tray containing the product to be packaged, and remain trapped therein after said step of welding the film H onto the edge of the tray. This step is immediately followed by the step in which the film is cut, by the lowering of the means 6 which partially enter the annular recess 14, after which the inner chambers of the housings are brought to atmospheric pressure, the means 5 and 6 are raised, the housings are moved away from each other, the extractor 7 raises the packaged tray from the seat 10, and known means come into operation in order to remove the sealed trays, to replace them with new trays to be sealed, to advance the film H, to remove the waste part of the film and move it towards collection means, and to provide a new intact portion of the same film above the new trays to be sealed.

Figure 6:
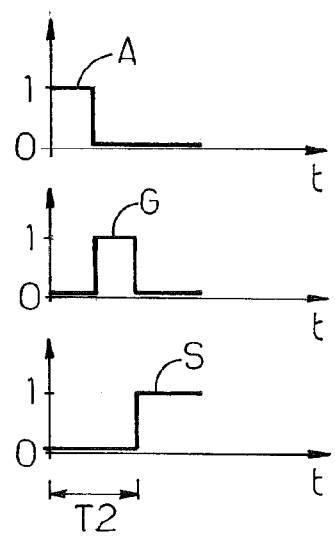
Figure 7:
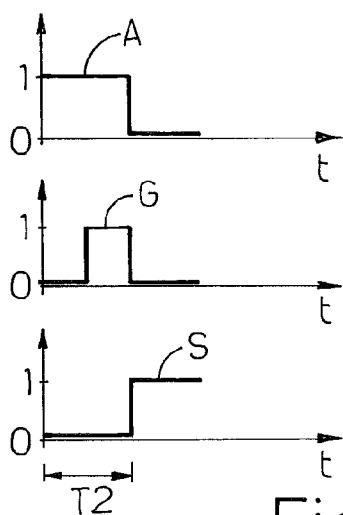
Figure 8:
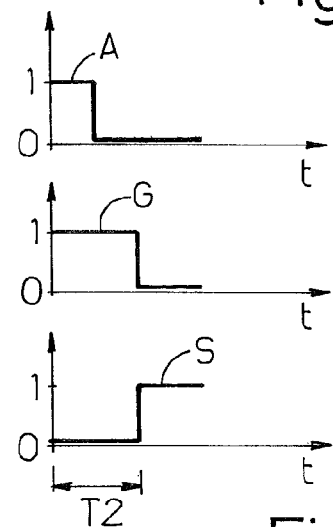

The three diagrams in FIG. 5 show the interaction of the vacuum or suction step A, the gas injection step G and the welding step S in the prior art. The long amount of time elapsing in the step in which the suction A is active (position 1) is additional to the subsequent time in which the gas injection step G is active, and therefore when the welding step S is activated the total time taken for treating the inner volume of the tray to be sealed is the sum of the two aforesaid time intervals, which is equal to T1. However, FIG. 6 shows that the time T2 for treating the inner volume of the tray to be sealed can be reduced considerably with the apparatus according to the invention, since the active time of the vacuum step A is reduced and partially overlaps with the gas injection step G, as described above. The shorter vacuum formation time is obviously associated with a lower vacuum in the tray and in the housings, providing benefits in relation to the construction of the housings and of the various sealing gaskets. It is to be understood that what is described and illustrated in FIG. 6 is a possible, but not unique, mode of operation of the apparatus according to the invention. The diagrams in FIG. 7 show, for example, that the suction step A can also be maintained during the gas injection step G. On the other hand, the diagrams in FIG. 8 show that the gas injection step G can start at the same time as the vacuum step A which may have a brief duration. Again, it is to be understood that these are only some possible alternative modes of operation of the apparatus and that others may be used, possibly in response to specific packaging requirements.

Figure 3:
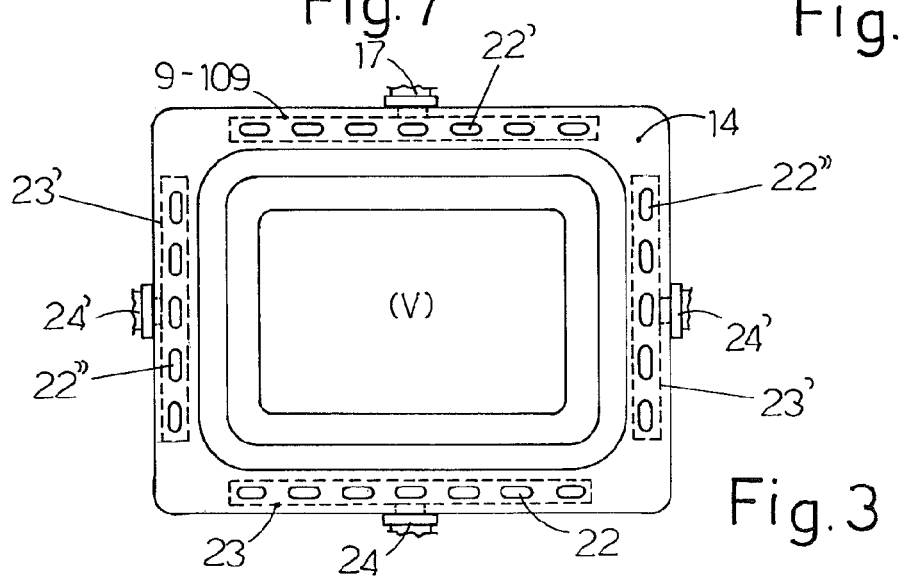
FIG. 3 shows a variant of the solution of FIG. 2.

As stated with reference to FIG. 2, the holes 22" in the shorter sides of the tray can be omitted or can be provided in a limited number and/or in an arrangement closer to the row of holes 22' than to the row 22, or can be provided with a different geometry and/or shape. The variant illustrated in FIG. 3 shows that the rows of holes 22" can be connected to corresponding manifolds 23' to which their conduits 24' are connected. In the vacuum formation step, all the holes 22, 22' and 22" are in suction mode. However, when the gas injection step commences, the holes 22 are connected to the gas source, while the holes 22" can be closed or modified by, or in, connection with the outlet holes 22'. Simple means located behind the corresponding conduits 24' can be used to close or constrict said rows of holes 22" automatically, in such a way that the process gases flow from the holes 22 solely or predominantly towards the opposing holes 22' as indicated by the arrows Z in FIG. 2, so as to occupy in a uniform way, without any formation of vortices or reflux, the whole extension of the main chamber P containing the film, tray and product.

Using the means 20 of FIG. 1, located on the control panel of the machine, the operator can select and set the operating cycle which is most suitable for the packaging of the products in the trays at any given time, given that, in addition to the indicated cycles, the machine can execute packaging cycles with a vacuum only or normal packaging cycles.

The invention claimed is:

1. A packaging apparatus comprising;
a pair of opposed housings comprising an upper housing open downwardly and a lower housing opened upwardly, the lower housing having a main chamber and an outer chamber, which chambers are integrally connected together,
the main lower chamber having an opened top formed by an upwardly facing tray seat shaped and positioned to receive thereon an outward extending flange of a tray containing product to be sealed within the tray,
the outer lower chamber adjacent to the main lower chamber and in fluid communication with the main lower chamber,
the top of the outer lower chamber formed with an inner flat surface surrounding the tray seat and an outer flat surface spaced outwardly from the inner flat surface, the two flat surfaces being located at a higher level than the tray seat, at least one aperture between the two flat surfaces which places the outer lower chamber into communication with the exterior above the lower housing,
the upper housing having a main upper chamber and a bottom opening formed by a downwardly facing edge which is positioned above the inner flat surface of the lower housing such that when the two housing close against each other, the downwardly facing edge is in sealing engagement with the inner flat surface, and the lower housing is in fluid communication with the upper housing above the film through the at least one aperture,
the upper housing including an outer upper chamber adjacent to the main upper chamber and in fluid communication with the main upper chamber,
a welder located in the main upper chamber with welding surfaces positioned above the tray seat to weld a film located between the welding surfaces and the tray seat to a tray flange located on the tray seat,
a cutter also located in the main upper chamber and moveable to cut the film around the tray flange after the film has been sealed to the tray flange,
a vacuum source connected through the lower housing simultaneously exert a vacuum on the main lower chamber, the outer lower chamber, the main upper chamber and the outer upper chamber,
first holes located along at least one side of the tray seat and second holes located along at least one other side of the tray seat,
a source of process gas connected to the lower housing to deliver process gas to the first holes and into the tray between the product and the film,
the second holes connected to a vacuum source to draw air out of the tray,
a control valve connecting both the vacuum source and the source of process gas to their respective connections to the lower housing,
the control valve being operable in a first mode to simultaneously deliver process gas exclusively to the first holes while the second holes are exclusively connected to the vacuum source so that air from inside of the tray is eliminated through the second holes, and a second mode in which process gas is delivered exclusively through the first holes into the tray while the connection of the second holes are restricted or closed such that the process gas forces the residual air in the package towards or out of the tray through said second holes, whereby the interior of the tray is simultaneously flushed and saturated prior to sealing of the film to the tray.

2. A packaging apparatus according to claim 1, wherein when the two housings are closed against each other, the first flat surface and the downwardly facing edge hold the film between them spaced above the top of the tray.

3. A packaging apparatus according to claim 1, in which the first holes are connected to a manifold which is located inside of the lower housing, which manifold is connected to the process gas connection, and wherein both the process gas connection and the vacuum source connection are connected to the control valve, and
a processor with a program terminal connected to the control valve to control the flow of gas from the process gas source to its connection at the lower housing and to control the flow of gases from the vacuum connection to the vacuum source.

4. A packaging apparatus according to claim 1, including third holes extending from said tray seat into the outer lower chamber, said third holes located in a position between the positions of the two opposed sets of holes, and including a closure member for selectively closing the third holes, connecting the third holes though the vacuum source or connecting the third holes to the process gas connection.

5. A packaging apparatus according to claim 1, including a processor arranged to control operation of the control valve.

* * * * *